United States Patent [19]

Russo, Jr.

[11] 4,043,537

[45] Aug. 23, 1977

[54] APPARATUS FOR INSTALLING PULL LINES IN CONDUIT

[76] Inventor: John Charles Russo, Jr., 2100 Gen. Collins, New Orleans, La. 70114

[21] Appl. No.: 741,356

[22] Filed: Nov. 12, 1976

[51] Int. Cl.² .......................................... B65H 59/00
[52] U.S. Cl. ............................................... 254/134.4
[58] Field of Search ................................... 254/134.4

[56] References Cited

U.S. PATENT DOCUMENTS

| 3,034,766 | 5/1962 | Hamrich | 254/134.4 |
| 3,793,732 | 2/1974 | Hamrich | 254/134.4 |

FOREIGN PATENT DOCUMENTS

| 10,705 | 4/1910 | United Kingdom | 254/134.4 |

Primary Examiner—Al Lawrence Smith
Assistant Examiner—Robert C. Watson
Attorney, Agent, or Firm—Pugh & Keaty

[57] ABSTRACT

An apparatus and method for installing pull lines in conduits and retrieving the installed pull lines with an attached electrical cable through the conduit is disclosed. The apparatus provides a single structure which both installs the pull line and retrieves the installed line with a, for example, electrical cable or a heavier pull line attached. The device features an elongated valve actuating handle provided with a line containing reel. A driving pneumatic force can be attached to the handle operable through the valve portion thereof. The handle is provided with a chamber at its end portion which dispenses both the pull line from the reel, and driving pneumatic pressurized fluid. The device is provided with a vehicle which sealably contacts the walls of any conventional conduit and travels therethrough with the end portion of the pull line from the reel attached thereto. When the vehicle and attached pull line exit at an opposite end portion of the conduit through which an electrical cable is to be installed, the pull line can be hooked to the end portion of the electrical cable (or to a heavier pull line) and then reeled back through the conduit thus installing the desired cable or heavy pull line in the conduit. The line installed on the reel is the only line needed for initially traveling through the conduit with the vehicle and thereafter pulling the electrical cable or a heavier pull line through the conduit for the final installation.

6 Claims, 2 Drawing Figures

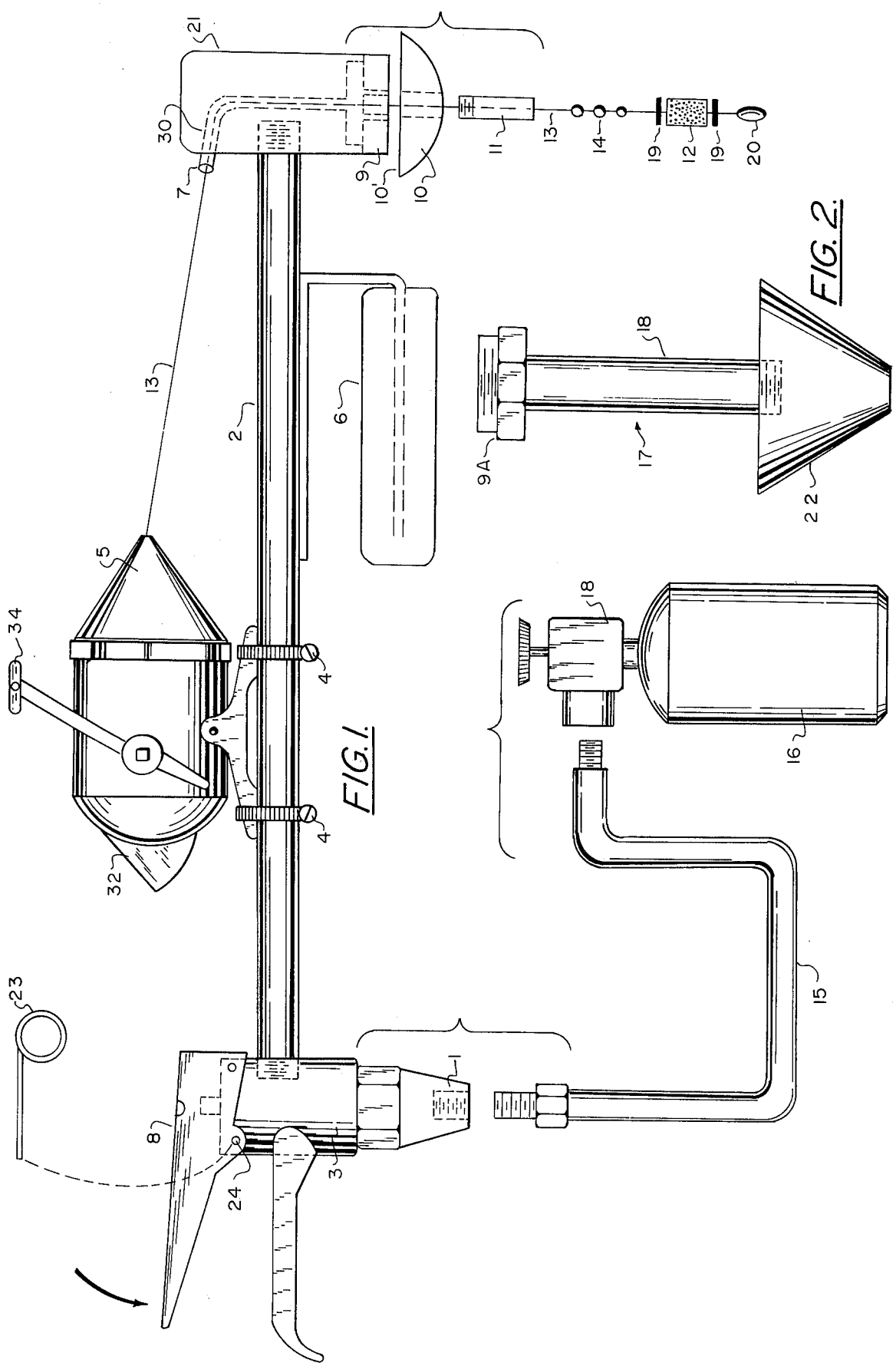

APPARATUS FOR INSTALLING PULL LINES IN CONDUIT

BACKGROUND OF THE INVENTION

1. Field of the Invention

The present invention relates to an apparatus for installing, for example, cable or wiring in an electrical conduit, and more particularly, the present invention relates to a device for first sending a pull line under pneumatic pressure through an electrical conduit, and thereafter retrieving the same pull line with a desired cable or heavier pull line attached thereto.

2. General Background and Prior Art

The provision of electrical circuits in residential, commercial and industrial structures conventionally involves the initial placement of junction boxes and interconnecting conduit which can be either rigid or flexible. Thereafter, links of electrical conducting wire are installed between the junction boxes through each connecting link of conduit. When this task is completed, the exposed wire ends of the electrical cable are connected to switches, appliances and the like in a desired manner. A problem arises in the installation of rigid electrical cable, usually copper, through the bending, turning conduit between junction boxes at the conduit ends. For the most part, conduit is relatively small allowing only a minor amount of space after the cable is installed.

The present practice in the industry is the utilization of a vehicle with a line attached, which carrier is propelled through the conduit by means of pneumatic pressure applied by using a cylinder of compressed gas or the like to one end inlet of the conduit. The vehicle, which can be of foam rubber, for example, exits at the opposite end portion of the conduit through which cable will be installed. Generally, the carrier will have an attached line which will be hooked to a desired heavier pull line or directly to the electrical wire or cable itself, and then pulled by hand back through the conduit to make the necessary installation. This involves in many instances a vast waste of materials as each line is discarded after a single use.

Several devices have been patented which attempt to solve the problem of installing pull lines in electrical conduit. Examples of these prior art devices which have been patented are listed in the following table.

| PRIOR ART PATENTS | | |
| --- | --- | --- |
| U.S. PAT. NO. | INVENTOR(S) | ISSUE DATE |
| 1,827,239 | C. E. Kelley | 10/13/31 |
| 3,119,600 | K. D. Bitter | 1/28/64 |
| 3,179,375 | J. C. Hamrick | 4/20/65 |
| 3,301,531 | R. J. Corsiglia | 1/31/67 |
| 3,689,031 | Ruddick et al. | 9/5/72 |
| 3,793,732 | J. C. Hamrick | 2/26/74 |
| 3,837,624 | T. G. Dandurand | 9/24/74 |

The devices which have been patented generally require the use of a new piece of feed line to be threaded through the conduit on each installation. This is both costly and wasteful.

Several of the prior devices do not have a means for rewinding the string, thus the string is merely pulled through and discarded after each use. Other devices are extremely complex and therefore costly, utilizing "vehicles" which travel through the conduit that are complex and expensive to manufacture. Some devices require the use of electricity, which can be a problem where electrical power is not available as is often the case in the preliminary stages of construction of a particular structure.

GENERAL DISCUSSION OF THE PRESENT INVENTION

The present invention provides a device for installing a pull line through a conduit section, which device is comprised of an air chamber body portion having a valving handle attached thereto. A supply of compressed air can be attached to the valve handle so that pneumatic fluid can be supplied through the air chamber as needed by actuation of the valve. The air chamber body has a line dispensing tip portion through which a feed line is fed from a dispensing reel mounted on the air chamber body. Line can be removed from the reel and rewound as needed.

Compressed air is supplied through the air chamber tip portion of the body to a nozzle, where the apparatus of the present invention can be attached to a section of conduit through which the line can be fed and retrieved when needed with the desired electrical cable attached thereto.

The reel can be actuated to dispense or retrieve the common line as needed. A vehicle is provided which is attachable to the end portion of the reel line and can be sealably placed within the conduit and propelled therethrough by use of pneumatically pressurized fluid supplied by the actuation of the valve. Nozzles as necessary in differing sizes can be provided to fit various size conduit sections.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 1 is partially exploded frontal view of the preferred embodiment of the apparatus of the present invention; and FIG. 2 is a frontal view of an alternative embodiment of the conduit seal portion of the apparatus of the present invention.

DETAILED DESCRIPTION OF THE PREFERRED EMBODIMENT

Structure

Referring to FIG. 1 of the drawings, it can be seen that the apparatus of the present invention provides an elongated, tubular body air chamber 2 having a valve 3 attached to one end portion thereof. Valve 3 is provided with an actuating handle 8 which is pivotally connected to valve body 3, such that compression of handle 8, as shown by the arrow in FIG. 1, operates valve 3 thereby releasing fluid under pressure from air supply tank 16 through gate valve member 18, flexible hose 15 through valve 3 into air body chamber 2 and out of the tip portion 11 of line dispensing air chamber 21. Operation of valve 3 can be arrested in a closed inoperative position by the insertion of pin 23 in aperature 24 as shown in FIG. 1.

Hand support 6 can be rigidly affixed to the outer surface of air chamber 2 thus providing a handle which can be grasped and provides a leverage point as will be described more fully hereinafter. Reel 5, having an inner spool (not shown) holding a sufficient length of feed line 13 thereon is rigidly affixed to body chamber 2 using clamps 4. Line 13 can be any conventional monofiliment line, such as 90 pound monofiliment test line. In the preferred embodiment, an exemplary four hundred feet of line 13 can be housed in reel 5. Both pneumatically pressureized fluid for the driving of line 13 and an attached vehicle 12 and line 13 itself are supplied through line dispenser air chamber 21. An inner line guide 30 is provided to guideably transmit line 13 from reel 5 through dispensing tip 21 out tubular tip 11.

Tip portion 11 can be threadably engaged at adaptor 9 to line dispenser 21. A preferably circular concave seal 10 is provided around the periphery of dispensing tip 11 to sealably engage the face portion of a section of conduit (not shown) through which line 13 is to be fed. The back flat surfact portion 10' of seal 10 abuts adaptor 9, thus providing a stop so that pressure on seal 10 can be effectively applied and thus seal pneumatically an opening to conduit through which line 13 is to be fed.

For differing sizes of conduits, seal 17 can be used as is illustrated in FIG. 2. Seal 17 is provided with a threaded adapter 9A which threadably attaches to line dispensing air chamber 21. Seal 17 has a frustro-connical flexible tip 22 which can be sized as needed to fit in a wide span of conduit diameters. Tip 2 fits around hollow dispensing tip 18 through which fluid can flow.

The tip portion of line 13 can be attached to a conventional swivel designated by the numeral 14, and the swivel portion attached to vehicle 12. Vehicle 12 is preferably a flexible material, such as foam rubber, having rigid and plates 19 which can sealably contact the wall portions of a conduit section. The flexible portion of vehicle 12 allows it to travel around corners. The opposite end portion of vehicle 12 from swivel 14 can be provided with a hook or loop designated by the numeral 20 to which a heavier pull rope can be connected when vehicle 12 exits a conduit section at the opposite end portion of where the vehicle entered.

OPERATION

To install a pull line 13 through a section of electrical conduit, the apparatus of the present invention is connected at adaptor 1 to hose 15 and air supply 16. The operator then inserts tip 11 into a desired conduit opening. Seal 10 abuts the conduit opening and sealably closes it. Pressure applied at handle 6 can perfect the seal between seal 10 and the conduit opening. When the necessary pressure is applied on handle 6 and a pneumatic seal perfected, reel 5 is actuated at release button 32 to place line 13 in an unwind position so that line 13 will freely leave reel 5 and travel through a section of conduit behind vehicle 12 to which it is attached. The operator, while pulling on handle 6 to perfect the seal, actuates valve 3 by depressing leverage handle 6 (after pin 23 is removed) thus opening the compressed air tank 16 to allow pneumatically pressurized fluid to drive through air chamber 2 and line dispensing air chamber 21, and tip 11 into a conduit section. The force of fluid pressure sends vehicle 12 (which sealably contacts the wall portions of the conduit) through the conduit until it exits at an outlet point as desired. A suitable pull rope, capable of later installing the actual electrical cable, is attached to line 13 at loop 20 and is retrieved using crank 34 back through the conduit section.

From the above, it can be seen that no premeasurement of line 13 is necessary. It can also be seen that no waste of line 13 results when the operation is complete. Additionally, a mess of unwound line is not left at the users feet to thereafter hinder him in future and successive installations at that location.

Often a great amount of friction will result when line 13 is retrieved having attached to it a suitable pull rope. The present invention provides an elongated tubular body 2 which acts much like a conventional fishing pole by giving leverage to aid in retrieving the pull line. The operator grasps the device at handle 6 and at valve hendle 8, and with the apparatus so held by both hands, the user can first pull the line and then wind it using crank 34. The operation is much like the retrieving of a fish using a conventional rod and reel. Thus, the present invention overcomes excessive drag between the attached pull rope and the conduit walls.

Because many and varying embodiments may be made within the scope of the inventive concept herein taught, and because many modifications may be made in the embodiment herein detailed in accordance with the descriptive requirements of the law, it should be understood that the details herein are to be interpreted as illustrative and not in a limiting sense.

I claim:

1. An apparatus for installing a pull line in a section of conduit, comprising:
   a. an elongated, tubular body provided with a central conduit, said conduit capable of transmitting pressurized fluids therethrough;
   b. valve means attached to one end portion of said body, for transmitting pressurized fluid from a pneumatic source through said valve means into said tubular body;
   c. reel means affixable to said body for dispensing a length of line said reel means being provided with an integral spool of line therein;
   d. dispensing means attached at the opposite end portion of said body from said valve means for transmitting pressurized fluid into a section of conduit, said dispensing means provided with a reduced tip portion insertable into the opening of said conduit, said dispensing means being oriented at substantially right angles with said elongated body; and
   e. tube means on said dispensing means for guiding the line from said reel means through said dispensing means.

2. The apparatus of claim 1, wherein there is further provided a leverage handle attachable at the end portion of said tubular body from said valve means, said handle providing a gripping surface to which pressure can be applied in the same direction as said dispensing means and at substantially right angles to said elongated body, and said valve means provides a gripping surface thereon.

3. The apparatus of claim 1, wherein said dispensing means is a pneumatic chamber having an inlet portion where said dispensing means is attached to said body, and an outlet which can be sealably connected to the inlet of an electrical conduit section.

4. The apparatus of claim 1, wherein said tube means is a conduit having a diameter slightly larger than the diameter of the line in said reel means, said tube means having an inlet portion with its orfice facing the outlet of said reel means, said tube means having its outlet orfice substantially concentric with the outlet portion of said dispensing means.

5. The apparatus of claim 1, wherein there is further provided a pliable vehicle provided with a hooked means for attaching said pliable vehicle to a length of line.

6. The apparatus of claim 1, wherein said reel means is provided with release means for allowing line on said reel means to substantially frictionlessly leave said reel means, and said reel means is provided with a crank for retrieving dispensed line into said reel means, said release means being deactivated, halting the release of line from said reel, when said crank is turned to begin retrieval of dispensed line to said reel.

* * * * *